United States Patent [19]

Taneya

[11] Patent Number: 5,436,884
[45] Date of Patent: Jul. 25, 1995

[54] OPTICAL DATA READING APPARATUS AND AN OPTICAL DATA READING METHOD

[75] Inventor: Mototaka Taneya, Nara, Japan

[73] Assignee: Sharp Kabushiki Kaisha, Osaka, Japan

[21] Appl. No.: 125,473

[22] Filed: Sep. 22, 1993

[30] Foreign Application Priority Data

Sep. 24, 1992 [JP] Japan .................. 4-255073

[51] Int. Cl.$^6$ .................................. G11B 5/09
[52] U.S. Cl. .......................... 369/112; 369/44.23
[58] Field of Search ............... 369/44.25, 44.37, 60, 369/47, 100, 110, 112, 106, 120, 121

[56] References Cited

U.S. PATENT DOCUMENTS 5,214,633 5/1993 Tanno et al. ............... 369/112
5,233,582 8/1993 Tanno et al. ............... 369/100

FOREIGN PATENT DOCUMENTS 0438042 7/1991 European Pat. Off. .
61-227237 9/1986 Japan .

OTHER PUBLICATIONS

Kobayashi, T., "Interferometry for measuring distance and displacement using semiconductor lasers" *Optics* (1988) 17(6):279–284.

Tatsuno, K., et al., "Diode laser direct modulation heterodyne interferometer" *Applied Optics* (1987) 26(1):37–40.

*Primary Examiner*—Paul M. Dzierzynski
*Assistant Examiner*—Don Wong
*Attorney, Agent, or Firm*—Morrison & Foerster

[57] ABSTRACT

According to the optical data reading apparatus and an optical data reading method of the present invention, a semiconductor laser emits laser light while periodically modulating a frequency or a phase thereof. The laser light is divided into a first beam to be radiated to a magnetooptical disc and a second beam. The first and the second beams run along optical paths having different lengths from each other, and thus have different frequencies or phases from each other. The first beam reflected by the magnetooptical disc and the second beam are mixed and then incident on a photodetector. An electric output extracted from the photodetector based on a frequency difference or a phase difference between the first and the second beams, and thus data stored in the magnetooptic disc is restored.

16 Claims, 7 Drawing Sheets

OPTICAL DATA READING APPARATUS AND AN OPTICAL DATA READING METHOD

BACKGROUND OF THE INVENTION

1. Field of the Invention

The present invention relates to an optical data reading apparatus and method for reading data stored in a recording medium such as an optical memory, and in particular to an optical data reading apparatus and method for reading data at a high sensitivity used for a high density optical recording system.

2. Description of the Related Art

As optical memories, read only memories such as compact discs and video discs and rewritable optical memories such as magnetooptical discs are known. Such optical memories are widely used today due to advantages thereof such as large capacity, low cost per bit, and portableness. For the future, such optical memories having a larger capacity and a smaller size are demanded as the society becomes more and more information-oriented.

FIG. 9 shows a representative construction of a conventional optical data reading apparatus designed for reading data stored in a magnetooptical disc 906. As is shown in FIG. 9, the optical data reading apparatus includes a magnet 917, on one of two sides of the magnetooptical disc 906, for applying a magnetic field to the magnetooptical disc 906. On the other side, i.e., a reading side, of the magnetooptical disc 906, the optical data reading apparatus includes a semiconductor laser 901, a collimator lens 902, a beam shaping prism 903, a first beam splitter 904, an objective lens 905, a second beam splitter 907, a λ/2 plate 908, a polarization beam splitter 909, condenser lenses 910 and 911 for condensing light carrying an optical signal, high speed PIN photodetectors 912 and 913, a differential amplifier 914, a condenser lens 915 for detecting a tracking error/focus error, and a photodetector 916 for detecting a tracking error/focus error.

Optical data is read in the following manner by such an optical disc reading apparatus.

Laser light emitted by the semiconductor laser 901 is collimated by the collimator lens 902, and then shaped into a circular beam by the beam shaping prism 903. The laser light emitted by the semiconductor 901 is linearly polarized light. Such linearly polarized laser light is transmitted through the first beam splitter 904, condensed by the objective lens 905, and then radiated to the magnetooptical disc 906. Data is digitally recorded in the magnetooptical disc 906 by magnetizing the magnetooptical disc 906 perpendicularly to two surfaces thereof. When the radiated laser light is reflected by the magnetooptical disc 906, the plane of polarization of the laser light is rotated as a result of the Kerr effect in accordance with the data stored in the magnetooptical disc 906. A rotation direction of the plane of polarization in accordance with data "1" is opposite to a rotation direction thereof in accordance with data "0". Using this principle, the data are read by detecting in which direction the plane of polarization is rotated.

After being reflected by the magnetooptical disc 906, the laser light having optical signal corresponding to data "1" or "0" is turned at 90° by the first beam splitter 904 and then divided into a first component and a second component by the second beam splitter 907. The first component is transmitted through the condenser lens 915, and then converted by the photodetector 916 into an electric signal used for detecting a tracking error/focus error. A plane of polarization of the second component is rotated at 45° by the λ/2 plate 908, and thus resultant optical signal is used for data detection.

FIG. 10 shows two components included in the laser light immediately after transmitting through the λ/2 plate 908. As is shown in FIG. 10, the laser light includes a component 1001 (corresponding to the second component) obtained by rotating the plane of polarization of the laser light by the magnetooptical disc 906 and a component 1002 having a plane of polarization thereof not being rotated. The component 1002 includes noise obtained through reflection by surfaces of the parts of the optical data reading apparatus other than the magnetooptical disc 906. The components 1001 and 1002 are superimposed on each other. The laser light including the components 1001 and 1002 is divided into an s-wave component and a p-wave component when being incident on the polarization beam splitter 909. The p-wave component is transmitted straight through the polarization beam splitter 909, whereas the s-wave component is turned at 90° by the polarization beam splitter 909.

The p-wave component is condensed by the high speed condenser lens 911 to the high speed PIN photodetector 913, where the p-wave component is converted into an electric signal. The s-wave component is condensed by the condenser lens 910 to the high speed PIN photodetector 912, where the s-wave component is converted into an electric signal. The electric signals outputted from the high speed PIN photodetectors 912 and 913 are amplified by the differential amplifier 914. The differential amplification is performed in order to eliminate the electric signal obtained from the component 1002 and thus to detect only the electric signal obtained from the component 1001 as an electric output.

Practically, in the case of the component 1001 shown in FIG. 10, the p-wave component is larger than the s-wave component. Accordingly, the electric signal obtained by the differential amplification, i.e., the (p-wave component)-(s-wave component) has a positive value. In a case where the plane of polarization of the component 1001 is rotated in the opposite direction by the magnetooptical disc 906, i.e., in a case where the optical data is recorded in the magnetooptical disc 906 by magnetizing the magnetooptical disc 906 oppositely to the case shown in FIG. 10, the s-wave component is larger than the p-wave component. In such a case, the electric signal obtained by the differential amplification has a negative value. In the component 1002, the p-wave component and the s-wave component have an identical level with each other in either case. By this principle, only the electric signal obtained from the component 1001 is detected as an electric output by the differential amplifier 914, and thus the data "1" or "0" stored in the magnetooptical disc 906 is restored.

In the above example, differential amplification is used. In all types of conventional optical data reading apparatuses including an apparatus for a magnetooptical disc, a direct detecting method for directly detecting the intensity of light is used for signal detection.

For optical recording mediums such as an optical memory for a magnetooptical disc, a larger capacity and a higher recording speed are demanded. In order to fulfill such demands, a magnetooptical disc having a higher density recording medium and a higher rotation speed is required. In correspondence with such development in the density and the rotation speed, a recording area allocated for one bit, i.e., one recording unit is further reduced. As a result, the intensity of the light reflected by the recording medium (i.e., signal light) is lowered, and the pulse width of the signal light per bit is decreased. In other words, an amount of energy of the signal light per bit is reduced. Under these circumstances, the power level of the signal light becomes close to the temporal noise level of the photodetector. For this reason, a conventional optical data reading apparatus which uses light having a wavelength in a range around 780 nm has a problem in that data stored in a disc having a high density of 0.7 Mbits/mm$^2$ cannot be read with high sensitivity.

As one solution of this problem, use of laser light having a shorter wavelength has actively been studied. However, a laser for emitting laser light having a short wavelength which is desirable for an optical memory having a largest memory available is not put into practice in time with the development of such an optical memory. Even if a laser for emitting light having a desirably short wavelength is developed, an optical memory having a still larger capacity which can be operated using such a laser is demanded. In consideration of these matters, this approach also has a problem in that a highly sensitive detecting mechanism is required.

As is mentioned above, the conventional optical data reading apparatuses employ a direct detecting method in which the level of an optical output is directly detected by a photodetector. Such a method cannot cope with future increases in memory capacity, density and recording speed.

SUMMARY OF THE INVENTION

In an optical data reading apparatus according to the present invention, laser light is radiated to a recording medium having data stored therein, the laser light having an identical size with that of a recording unit at the recording medium, and the laser light reflected by the recording medium is detected by a photodetector, whereby the data stored in the recording medium is read in a noncontact state. Such an optical data reading apparatus includes laser light generating means for emitting laser light while periodically modulating a frequency thereof; light dividing means for dividing the laser light emitted by the laser light generating means into a first beam to be radiated to the recording medium and a second beam; means for creating a difference in optical path length between the first beam and the second beam, and thus creating a difference between a frequency of the first beam and a frequency of the second beam; means for mixing the first beam reflected by the recording medium and the second beam and directing light including the first beam and the second beam to be incident on the photodetector; and data restoring means for extracting an electric output from the photodetector based on the difference between the frequency of the first beam and the frequency of the second beam, and thus restoring the data stored in the recording medium.

In one embodiment of the invention, the laser light generating means is a distributed feedback laser including a diffraction element in a waveguide portion thereof.

In another embodiment of the invention, the light dividing means is a beam splitter.

In another embodiment of the invention, the data restoring means includes noise cancelling means for cancelling noise.

In another embodiment of the invention, the first beam and the second beam are sufficiently different from each other in optical path length to cause a detectable frequency difference.

In an optical data reading apparatus according to the present invention, laser light is radiated to a recording medium having data stored therein, the laser light having an identical size with that of a recording unit at the recording medium, and the laser light reflected by the recording medium is detected by a photodetector, whereby the data stored in the recording medium is read in a noncontact state. Such an optical data reading apparatus includes laser light generating means for emitting laser light while periodically modulating a phase thereof; light dividing means for dividing the laser light emitted by the laser light generating means into a first beam to be radiated to the recording medium and a second beam; means for creating a difference in optical path length between the first beam and the second beam, and thus creating a difference between a phase of the first beam and a phase of the second beam; means for mixing the first beam reflected by the recording medium and the second beam, and directing light including the first beam and the second beam to be incident on the photodetector; and data restoring means for extracting an electric output from the photodetector based on the difference between the phase of the first beam and the phase of the second beam, and thus restoring the data stored in the recording medium.

In one embodiment of the invention, the laser light generating means is a distributed feedback laser including a diffraction element in a waveguide portion thereof.

In another embodiment of the invention, the light dividing means is a beam splitter.

In another embodiment of the invention, the data restoring means includes noise cancelling means for cancelling noise.

In another embodiment of the invention, the first beam and the second beam are sufficiently different from each other in optical path length to cause a detectable phase difference.

In an optical data reading method according to the present invention, laser light is radiated to a recording medium having data stored therein, the laser light having an identical size with that of a recording unit at the recording medium, and the laser light reflected by the recording medium is detected by a photodetector, whereby the data stored in the recording medium is read in a noncontact state. Such an optical data reading method includes the steps of generating laser light while periodically modulating a frequency thereof; dividing the laser light into a first beam to be radiated to the recording medium and a second beam; making a difference in optical length between the first beam and the second beam, and thus making a difference between a frequency of the first beam and a frequency of the second beam; mixing the first beam reflected by the recording medium and the second beam, and directing light including the first beam and the second beam to be incident on the photodetector; and extracting an electric output from the photodetector through a beat signal generated by the difference between the frequency of the first beam and the frequency of the second beam, and thus restoring the data stored in the recording medium.

In one embodiment of the invention, the step of extracting the electric output and thus restoring the data includes a step of cancelling noise.

In another embodiment of the invention, the first beam and the second beam are sufficiently different from each other in optical path length to cause a detectable frequency difference.

In an optical data reading method according to the present invention, laser light is radiated to a recording medium having data stored therein, the laser light having an identical size with that of a recording unit at the recording medium, and the laser light reflected by the recording medium is detected by a photodetector, whereby the data stored in the recording medium is read in a noncontact state. Such an optical data reading method includes the steps of generating laser light while modulating a phase thereof; dividing the laser light into a first beam to be radiated to the recording medium and a second beam; creating a difference in optical path length between the first beam and the second beam, and thus creating a difference between a phase of the first beam and a phase of the second beam; mixing the first beam reflected by the recording medium and the second beam, and directing light including the first beam and the second beam to be incident on the photodetector; and extracting an electric output from the photodetector through a beat signal generated by the difference between the phase of the first beam and the phase of the second beam, and thus restoring the data stored in the recording medium.

In one embodiment of the invention, the step of extracting the electric output and thus restoring the data includes a step of cancelling noise.

In another embodiment of the invention, the first beam and the second beam are sufficiently different from each other in optical path length to cause a detectable phase difference.

According to the present invention, laser light is emitted while a frequency or a phase thereof is periodically modulated. The laser light is divided into a first beam to be radiated to a recording medium and a second beam. By creating a difference in optical path length between the first beam and the second beam, the first beam and the second beam have different frequencies or phases from each other when being incident on a photodetector. The first beam reflected by the recording medium and the second beam are mixed and then incident on the photodetector. An electric output generated by a difference between the frequencies or the phases of the two beams is extracted from the photodetector, and thus data stored in the recording medium is restored.

In a case when the restoration is performed using a beat signal generated by the difference between the frequencies or the phases, the restoration can be done with high sensitivity.

Thus, the invention described herein makes possible the advantages of providing an optical data reading apparatus and method for reading data stored in a recording medium with a sufficiently high reliability even in cases where the output level of an optical signal is decreased to a very low level by reducing a recording area per bit of the recording medium.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrating examples with reference to the accompanying drawings.

Example 1

Figure 1:
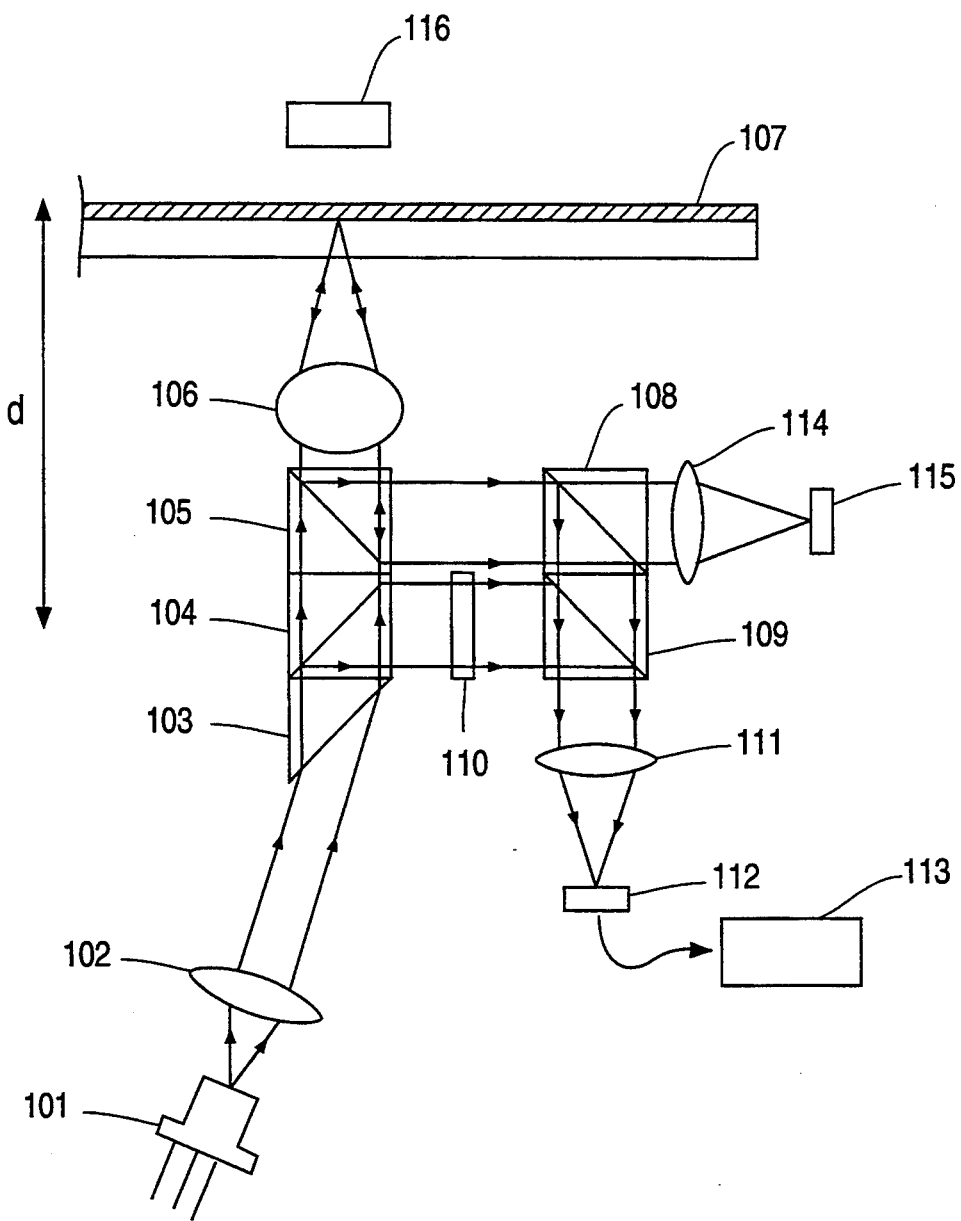
FIG. 1 is a schematic view of an optical data reading apparatus in a first example according to the present invention.

FIG. 1 shows a basic construction of an optical data reading apparatus for reading data stored in a magnetooptical disc in a first example according to the present invention.

As is shown in FIG. 1, the optical data reading apparatus includes a magnet 116, on one of two sides of the magnetooptical disc 107, for applying a magnetic field to the magnetooptical disc 107. On the other side, i.e., a reading side, of the magnetooptical disc 107, the optical data reading apparatus includes a distributed feedback semiconductor laser 101 (hereinafter, referred to as the "DFB semiconductor laser") for emitting laser light having a spectrum of a single longitudinal mode in a range around 780 nm. The optical data reading apparatus further includes a collimator lens 102, a beam shaping prism 103, four beam splitters 104, 105, 108 and 109, an objective lens 106, a λ/2 plate 110, a condenser lens 111 for condensing light, a PIN photodetector 112 for detecting a signal, a signal processing circuit 113, a condenser lens 114 for detecting a tracking error/focus error, and a photodetector 115 for detecting a tracking error/focus error.

A principle for reading data in such an optical data reading apparatus will be described hereinafter.

The DFB semiconductor laser 101 emits laser light having a spectrum of a single longitudinal mode while periodically modulating a frequency (i.e., oscillation wavelength) thereof. The laser light emitted in such a manner is linearly polarized light. In order to generate laser light with such properties, the DFB semiconductor laser 101 having a diffraction grating in a waveguide region thereof is used, the DFB semiconductor laser 101 including a plurality of electrodes to have a function of varying a wavelength of the laser light.

The linearly polarized laser light emitted by the DFB semiconductor laser 101 is collimated by the collimator lens 102 and then shaped into a circular beam by the beam shaping prism 103. The laser light is then divided into a first beam and a second beam by the beam splitter 104. The first beam is condensed to have a smallest possible diameter which is sufficient for diffraction by the objective lens 106. Thereafter, the first beam is radiated to the magnetooptical disc 107. In other words, the laser light at a radiation surface of the magnetooptical disc 107 has a diameter which is identical with the size of a recording unit, i.e., an recording area per bit of the magnetooptical disc 107. The first beam reflected by the magnetooptical disc 107 has a plane of polarization thereof slightly rotated by the Kerr effect and thus is used for carrying an optical signal which corresponds to the data stored in the magnetooptical disc 107. The first beam is transmitted through the objective lens 106, and then turned by the beam splitter 105 to get out of an optical path for radiation to the magnetooptical disc 107.

The first beam is then divided into a first component and a second component by the beam splitter 108. The first component is transmitted through the condenser lens 114, and then converted by the photodetector 115 into an electric signal used for detecting a tracking error/focus error. The second component is incident on the beam splitter 109 as signal light carrying an optical signal to be detected for data reading. A plane of polarization of the second beam is rotated by the λ/2 plate 110 at an angle of θr to be used as reference light, and then the second beam is incident also on the beam splitter 109. In this manner, the signal light and the reference light are mixed at the beam splitter 109. An optical path length of the signal light and an optical path length of the reference light up to the beam splitter 109 are different by 2d (d: a part of an optical path of the first beam which extends from the beam splitter 104 to a plane of the magnetooptical disc 107, the plane reflecting the first beam). Light including the signal light and the reference light mixed therein is then condensed through the condenser lens 111 and converted into an electric signal and square-law-detected by the photodetector 112.

According to the present invention, the signal light carrying an optical signal and the reference light are mixed, and the optical signal is detected by the photodetector 112. A principle for such a detection will be described hereinafter.

Figure 2:
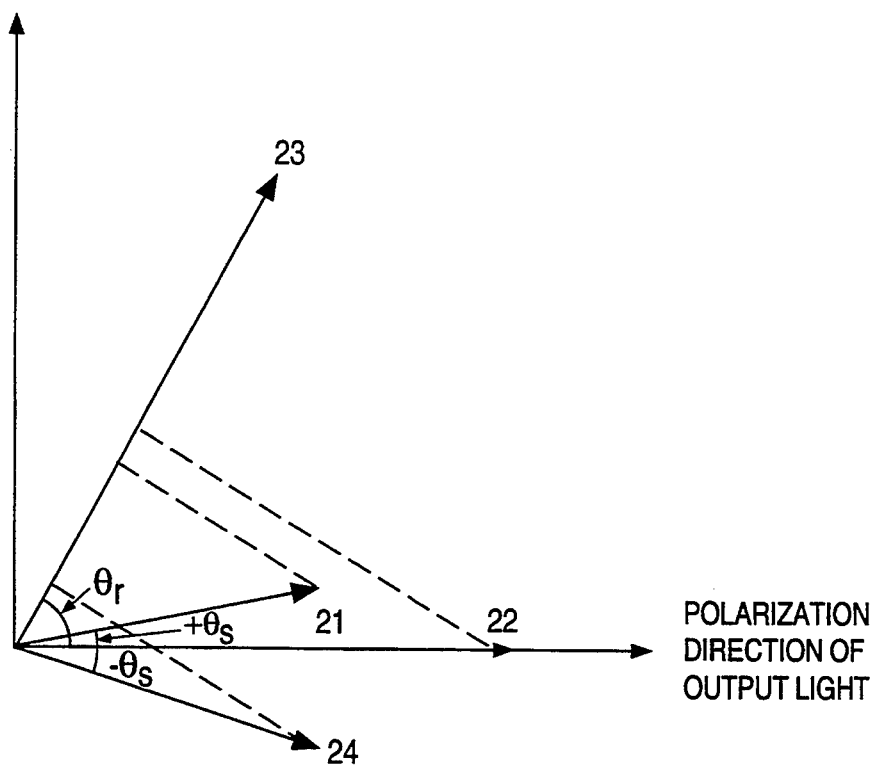
FIG. 2 is a view illustrating the relationship between a direction of a plane of polarization of a signal light and that of a reference light obtained in the first example.

FIG. 2 illustrates directions of planes of polarization of various components included in the light immediately before being incident on the PIN photodetector 112. The horizontal axis indicates a direction of the plane of polarization of the laser light immediately after being emitted by the DFB semiconductor laser 101. The plane of polarization of the signal light is directed as is indicated by vector 21 when the data to be read is "1", and as is indicated by vector 24 when the data to be read is "0". In other words, the plane of polarization of the signal light is rotated from the plane of polarization of the laser light immediately after being emitted by the DFB semiconductor laser 101 at an angle of $+\theta s$ when the data to be read is "1", and at an angle of $-\theta s$ when the data to be read is "0". The rotation in either angle is caused by interaction with a recording medium in the magnetooptical disc 107. Vector 22 indicates a direction of the plane of polarization of light including noise which is reflected by, for example, a surface of the magnetooptical disc 107 and thus does not interact with the recording medium. The plane of polarization of the reference light is directed as is shown by vector 23, i.e., is rotated at an angle of θr by the λ/2 plate 110 from the laser light immediately after being emitted by the DFB semiconductor laser 101.

The laser light emitted by the DFB semiconductor laser 101 has a frequency thereof periodically modulated. As is mentioned above, the optical path length of the signal light and the optical path length of the reference light have a difference of 2d. For these two reasons, the signal light and the reference light have slightly different frequencies from each other when being incident on the PIN photodetector 112.

Figure 3:
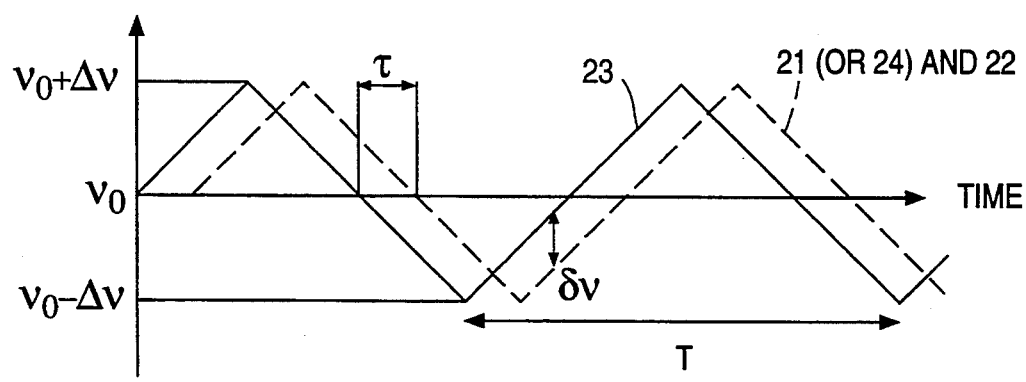
FIG. 3 is a view illustrating the relationship between the time and the frequency regarding the signal light and the reference light obtained by frequency modulation in the first example.

FIG. 3 shows the relationship between the time and the frequency regarding the reference light (corresponding to vector 23) and light including the signal light (corresponding to vector 21 or 24) and the light including noise (corresponding to vector 22; hereinafter, referred to as "noise light") immediately before being incident on the PIN photodetector 112. In this example, the frequency of the laser light emitted by the DFB semiconductor laser 101 is modulated to have a sawtooth-like waveform. The difference δν between the frequency of the reference light and that of the signal light is expressed by Formula (1).

$$\delta\nu = 4\Delta\nu\tau/T \qquad (1)$$

where Δν=frequency deviation used for frequency modulation

τ=2d/c (c: speed of light)

T=time period of one cycle

The reference light and the signal light which are slightly different in frequency from each other are each converted into an electric signal by the PIN photodetector 112. An electric field $E_r$ obtained from the reference light is expressed by Formula (2).

$$E_r = a_r \cos(2\pi \cdot \nu_r t) \qquad (2)$$

where
  $a_r$=amplitude
  $\nu_r$=frequency
  t=time

An electric field $E_s$ obtained from the signal light including the noise light is expressed by Formula (3).

$$E_s = a_s \cos(2\pi \cdot \nu_s \cdot t + \phi_s) \quad (3)$$

where
- $a_s$ = amplitude
- $\nu_s$ = frequency
- $t$ = time
- $\phi_s$ = difference in optical phase The electric current I outputted by the PIN photodetector 112 as an electric signal is expressed by Formula (4).

$$\begin{aligned} I &= (E_r + E_s)^2 \\ &= \tfrac{1}{2} \cdot \{a_r^2 + a_s^2 + 2a_r \cdot a_s \cdot \cos(s\pi \cdot \delta\nu \cdot t - \phi_s)\} \end{aligned} \quad (4)$$

A component whose frequency is too high for the PIN photodetector 112 to output a signal corresponding thereto is time-averaged and thus omitted.

As is seen from Formula (4), the electric current I includes a high frequency component generated by the difference between the frequency of the reference light and that of the signal light, in addition to an optical intensity component. Such a high frequency component is referred to as a "beat component". The amplitude of the beat component is expressed by $a_r a_s$. In other words, the signal light which is weak is substantially amplified by the reference light which is strong. According to the present invention, an optical signal can be detected with high sensitivity by using the reference light which has a sufficiently higher intensity, compared with an electric current $a_s^2$ obtained in a conventional apparatus employing the direct detecting method. Such a technology, which is applied for coherent detection in optical communications, is known as being effective in restoring original data from a weak optical signal.

In the coherent detection, only a component having an identical plane of polarization with that of the reference light contributes to the beat component. In FIG. 2, an electric field corresponding to only components obtained by projection to vector 23 from vector 21 or 24 and vector 22 contributes to the beat component when such components are incident on the PIN detector 112. A component perpendicular to the direction of the plane of polarization of the reference light only generates a DC component when being incident on the PIN photodetector 112 as in the case of incoherent light, and thus does not contribute to the beat component.

In an optical data reading apparatus in this example, a mechanism for detecting an optical signal has a function for selecting a component polarized in a certain direction. Accordingly, an optical device for dividing light into a plurality of components through polarization is not necessary.

After the electric current is outputted by the PIN photodetector 112, the digital data stored in the magnetooptical disc 107 is restored in the following manner.

From the electric current outputted by the PIN photodetector 112, only the beat component having a frequency of $\delta\nu$ is extracted by the signal processing circuit 113. In other words, a DC component and a noise component are eliminated from the electric current. The optical data is restored based on whether the amplitude of the beat component is large or small.

In order to restore the data digitally stored in the magnetooptical disc 107 with a high reliability, the frequency $\delta\nu$ of the beat component should be sufficiently higher than a signal transfer velocity around, for example, 10 MHz. The optical data reading apparatus in this example is designed to have a modulation center frequency used for frequency modulation of 50 MHz (modulation period used for frequency modulation: 20 ns), a frequency deviation $\Delta\nu$ /used for frequency modulation of a frequency of 10 GHz (corresponding to a wavelength of 0.002 nm), an optical path difference 2d between the two types of light of 100 mm, and a difference $\delta\nu$ of frequencies of the two types of light (i.e., beat frequency) of 667 MHz.

As has been described so far, in an optical data reading apparatus and method according to the present invention, data stored in a high density disc of 1 Mbits/mm$^2$ is read with a high reliability even when light having a wavelength in a range around 780 nm is used.

Further, according to an optical data reading apparatus and method according to the present invention, data writing is also possible. Data writing of 1 Mbits/mm$^2$ is performed to a magnetooptical disc including a recording medium having a lower sensitivity than average is used. Such a disc is used in order to reduce a recording area per bit. In an optical data reading apparatus using coherent light according to the present invention, both writing and reading at a high density of 1 Mbits/mm$^2$ is realized by using light having a wavelength in a range around 780 nm. A light source for emitting light having a shorter wavelength is not required.

Example 2

An optical data reading apparatus applied to a differential amplification detecting system will be described in a second example.

Figure 4:
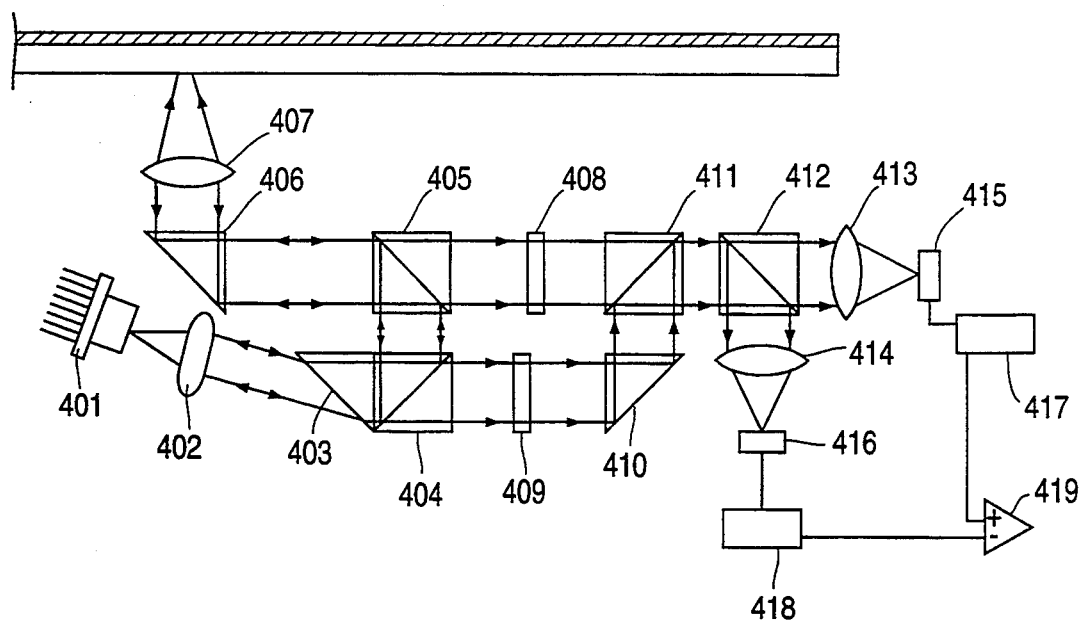
FIG. 4 is a schematic view of an optical data reading apparatus in a second example according to the present invention.

FIG. 4 shows a basic construction of an optical data reading apparatus in a second example according to the present invention. The optical data reading apparatus includes an oscillation wavelength-variable DFB semiconductor laser 401 for emitting linearly polarized laser light having a spectrum of a single longitudinal mode. The frequency of the laser light emitted by the DFB semiconductor laser 401 is modulated to have a sawtooth-like waveform with a modulation center frequency of 40 MHz.

The optical data reading apparatus is operated in the following manner.

The laser light emitted by the DFB semiconductor laser 401 is collimated by a collimator lens 402, and then shaped by a beam shaping prism 403. The laser light is then divided by a beam splitter 404 into a first beam to be radiated to a magnetooptical disc and a second beam to be used as reference light.

The first beam is turned at 90° by a beam splitter 405 and radiated to the magnetooptical disc by a mirror 406 and an objective lens 407. The first beam is reflected by the magnetooptical disc in a state of having a plane of polarization thereof rotated by interaction with a recording medium of the magnetooptical disc and thus used as signal light carrying an optical signal. The signal light has the plane of polarization thereof rotated at 45° by a λ/2 plate 408, and then incident on a beam splitter 411. The second beam used as the reference light is circularly polarized by a λ/4 plate 409 and then incident also on the beam splitter 411 by a mirror 410.

The signal light and the reference light are mixed at the beam splitter 411. Light including the signal light and the reference light is divided into a p-wave component and an s-wave component by a beam splitter 412. The p-wave component runs straight, and the s-wave component is turned at 90°. The p-wave component is incident on a PIN photodetector 415 by a condenser lens 413, whereas the s-wave component is incident on a PIN photodetector 416 through a condenser lens 414. The optical signal of each of the p-wave and the s-wave components is detected by the respective PIN photodetector 415, 416. A principle for such a coherent detection is identical with that described in the first example. Accordingly, the signal light which is weak is substantially amplified by using the reference light which has a large amplitude. Thus, the data can be restored from a signal light having a low C/N value.

Figure 5:
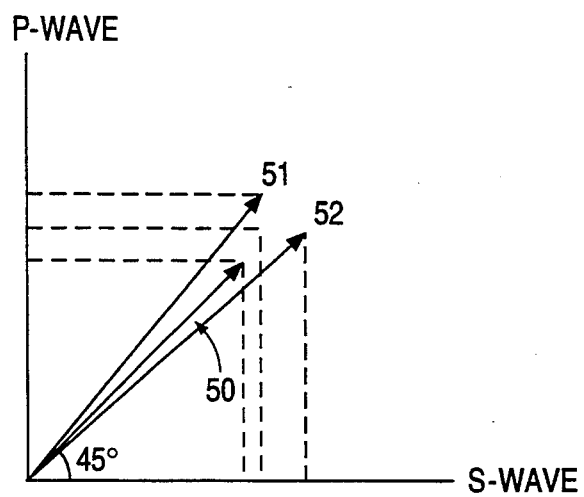
FIG. 5 is a view illustrating the relationship between a direction of a plane of polarization of a signal light and that of a reference light obtained in the second example.

FIG. 5 illustrates two vectors 51 and 52 of the signal light immediately before being incident on the beam splitter 412. The vertical axis indicates a direction of the plane of polarization of the p-wave component, and the horizontal axis indicates a direction of the plane of polarization of the s-wave component. Vector 51 corresponds to a case where the data stored in the magnetooptical disc is "1", and vector 52 corresponds to a case where the data stored in the magnetooptical disc is "0". Light including noise reflected by the parts other than the magnetooptical disc is indicated by vector 50. As is seen from FIG. 5, the light incident on the beam splitter 412 is divided into the s-wave component and the p-wave component obtained by projection to the horizontal axis and the vertical axis, respectively, from vectors 50, 51 and 52. The reference light which is circularly polarized is also divided into an s-wave component and a p-wave component at a ratio of intensity of 1:1. Thus, the optical signal of each of the p-wave and the s-wave components of the signal light is detected by using the respective reference light.

Figure 6:
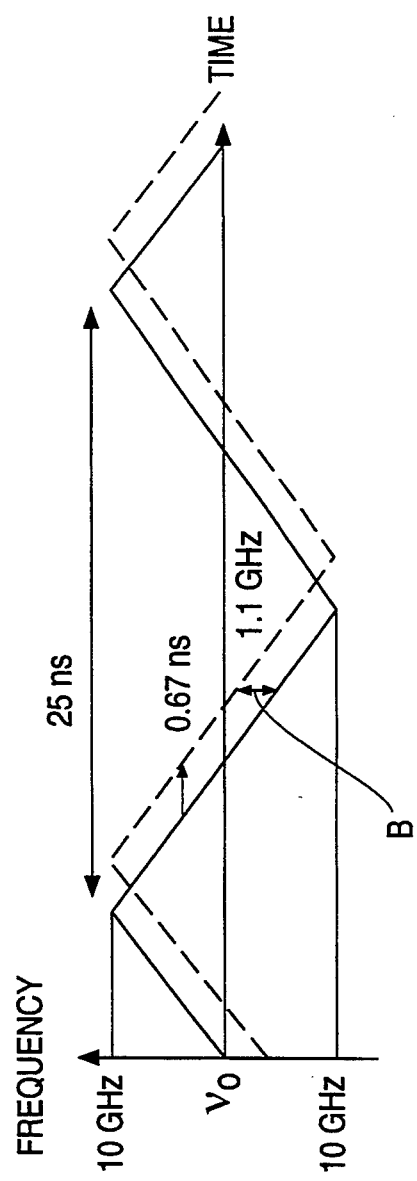
FIG. 6 is a view illustrating the relationship between the time and the frequency regarding the signal light and the reference light obtained by frequency modulation in the second example.

FIG. 6 shows the relationship between the time and the frequency regarding the signal light and the reference light immediately before being incident on the PIN photodetectors 415 and 416. The reference light is indicated by a solid line, and the signal light is indicated by a dashed line. The optical data reading apparatus used here is designed to have a frequency deviation used for frequency modulation in the frequency range of ±10 GHz, a modulation center frequency used for frequency modulation of 40 MHz (modulation period used for frequency modulation: 25 ns), and a difference in optical path length between the reference light and the signal light of 200 mm. In order to obtain such a large difference in optical path length, the signal light is made to run to the magnetooptical disc between the beam splitter 405 and the objective lens 407 in addition to an optical path of the reference light as is shown in FIG. 4. In such a construction, the delay of the signal light is approximately 0.67 ns, and a beat signal B generated by the difference between the frequency of the signal light and that of the reference light has a frequency of 1.1 GHz.

Outputs from the PIN photodetectors 415 and 416 are respectively sent to signal processing circuits 417 and 418 to extract the beat components thereof. After the amplitude of each of the beat components is detected, the difference between the optical output of the s-wave component and that of the p-wave component is detected by a differential amplifier 419 as a detection signal. The difference in the optical outputs is detected in order to eliminate light including noise (a plane of polarization of such light is not rotated) and to detect only a change in the electric current caused by the rotation of the plane of polarization of the signal light which carries an optical signal to be detected.

According to an optical data reading apparatus in the second example having a large difference in optical path length between the reference light and the signal light, the beat signal B is generated for ten or more time periods per T/2, which is half the modulation center frequency used for frequency modulation (FIG. 6). Although a phase of the beat signal B generated at a peak (±10 GHz) of the sawtooth-like waveform in FIG. 6 is not continuous, an adverse effect of such discontinuity on signal detection is restricted.

Example 3

According to an optical data reading apparatus in the first and the second examples, the detecting sensitivity is improved using frequency modulation. The detecting sensitivity can also be improved using phase modulation. In such a case, a laser for emitting laser light while periodically modulating an optical phase thereof is used. An optical data reading apparatus in a third example has an identical construction with that in the first or the second example, and thus description thereof is omitted.

As is in the first and the second examples, the signal light is incident on a PIN photodetector with a delay of time $\tau$. The electric field $E_r$ obtained from the reference light and the electric field $E_s$ obtained from the signal light, both immediately before being incident on the PIN photodetector are expressed by Formulas (5) and (6), respectively.

$$E_r = a_r \sin(2\pi \cdot \nu_0 \cdot t + \phi(t)) \quad (5)$$

where $\nu_0$ = center frequency $$E_s = a_s \sin(2\pi \cdot \nu_0 \cdot (t-\tau) + \phi(t-\tau)) \quad (6)$$

The photoelectric current I of light including the reference light and the signal light when being incident on the PIN photodetector is expressed by Formula (7).

$$I = \tfrac{1}{2} \cdot [a_r^2 + a_s^2 + 2 a_r a_s \cos\{2\pi \cdot \nu_0 \cdot t + \phi(t) - \phi(t-\tau)\}] \quad (7)$$

As is seen from Formula (7), in the case of phase modulation, since the reference light and the signal light have an identical frequency with each other, no beat signal is generated. In correspondence with a periodical change in phase difference $\phi(t) - \phi(t-\tau)$ between the reference light and the signal light, the electric current is outputted by the PIN photodetector in a state of being modulated to have an amplitude $a_r a_s$.

Figure 7A:
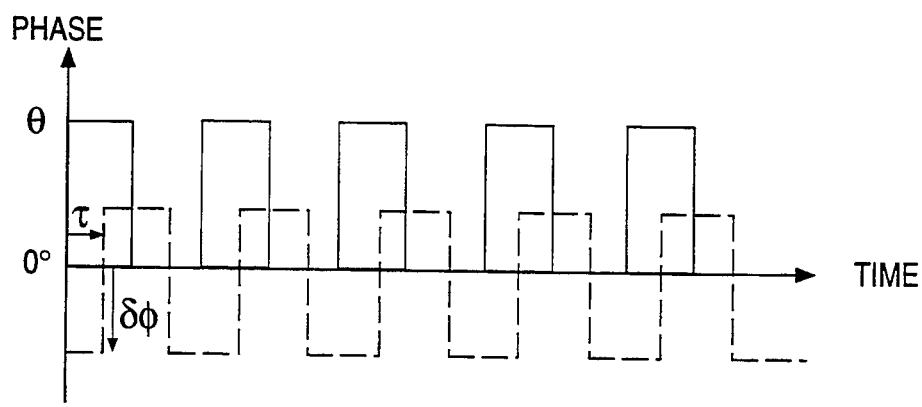
FIG. 7A is a view illustrating waveforms of a signal light and a reference light obtained by phase modulation in an optical data reading apparatus in a third example according to the present invention.
Figure 7B:
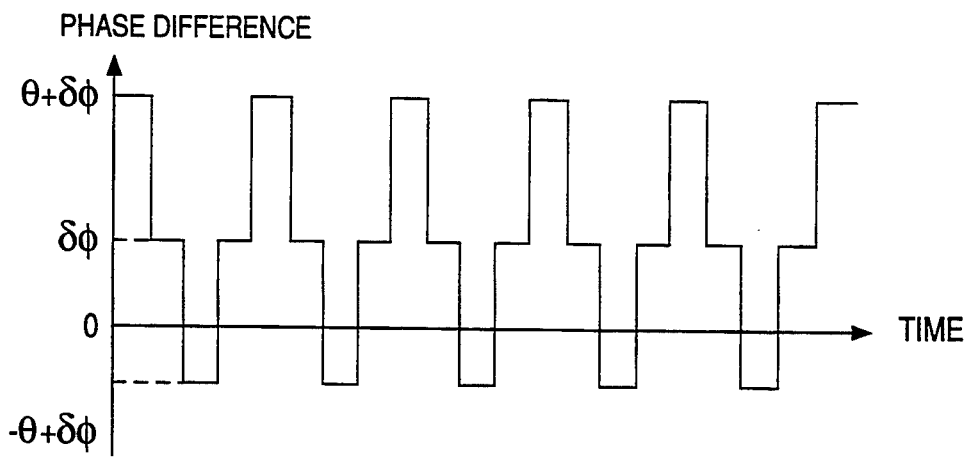
FIG. 7B is a view illustrating a change in the phase difference between the signal light and the reference light in accordance with time passage in the third example.

FIG. 7A shows a phase of laser light emitted by a semiconductor laser modulated by $\theta$ by the frequency of 1 GHz. The phase of the reference light is indicated by a solid line, and the phase of the signal light is indicated by a dashed line. The signal light is delayed with respect to the reference light by $\tfrac{1}{4}$ period by appropriately setting a difference between optical path lengths of the reference light and the signal light. As is seen from Formula (7), since the signal light runs along an optical path which is different in length from that of the reference light, the phase of the signal light is shifted in parallel by $\delta\phi$ with respect to the reference light when being incident on the PIN photodetector. FIG. 7B shows a change in such a phase difference between the signal light and the reference light in accordance with time passage.

Figure 7C:
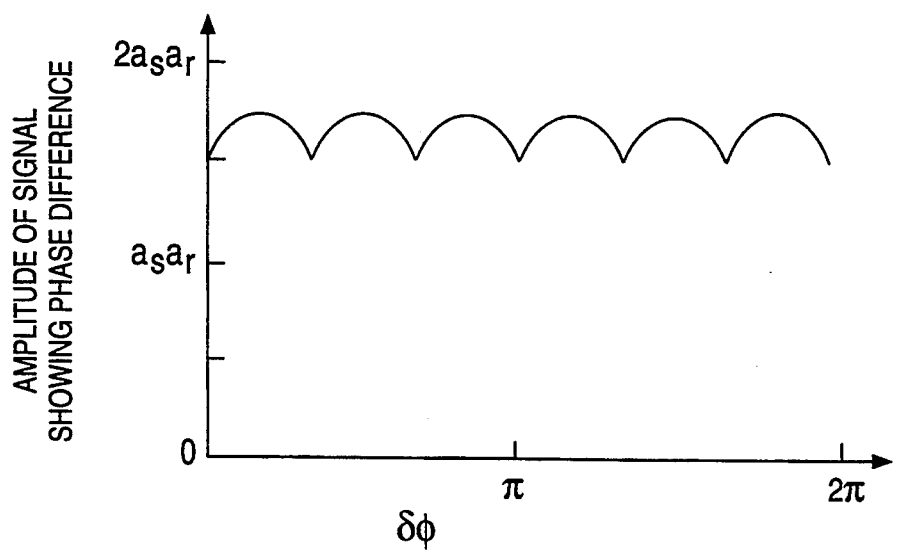
FIG. 7C is a view illustrating dependency of an amplitude of the reference light on $\delta\phi$ in the third example.

In this example, the phase of the laser light is modulated with $\theta = 120°$. An electric current outputted by the PIN photodetector based on the change in the phase difference between the signal light and the reference light has an amplitude (i.e., an amplitude of a signal in the frequency band between 1 GHz and 2 GHz) which is a function of $\delta\phi$ as is shown in FIG. 7C. As is seen from FIG. 7C, a signal component extracted from the electric current outputted by the PIN photodetector by eliminating a DC component has an amplitude of $1.5 a_s \cdot a_r$ to $1.75 a_s \cdot a_r$. In other words, an amplitude of an electric current which corresponds to signal light is substantially amplified by using the reference light having a sufficiently large amplitude $a_r$.

As is described in the first and the second examples, the signal light is amplified using the reference light. Even if a recording area per bit is decreased, thus to reduce the amplitude of the signal light, the electric current obtained from the signal light can be larger than $\frac{1}{2} \cdot a_s^2$, which is an electric current obtained by the direct detection method. As a result, a signal having a high C/N value can be obtained. The present invention is applied to phase modulation as well as to frequency modulation. A highly sensitive data restoration is achieved also by phase modulation.

Example 4

In the first, second and third examples, the present invention is applied to an optical data reading apparatus and method for reading data stored in a magnetooptical disc.

In a fourth example, an optical data reading apparatus used for an optical disc having a recording medium which utilizes light scattering caused by the shape of the disc, such as a phase change direct read after write (DRAW) optical disc and a read only optical disc.

Figure 8:
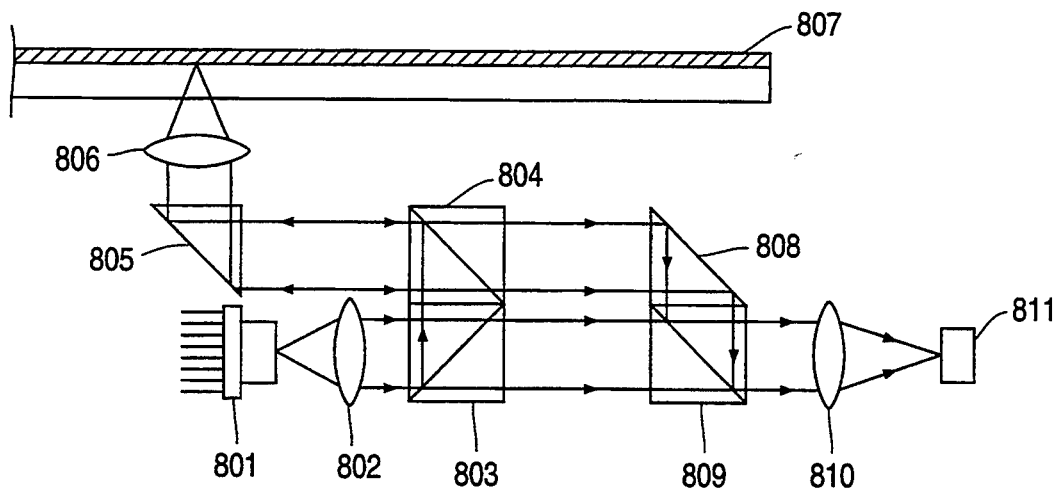
FIG. 8 is a schematic view of an optical data reading apparatus in a fourth example according to the present invention.
Figure 9:
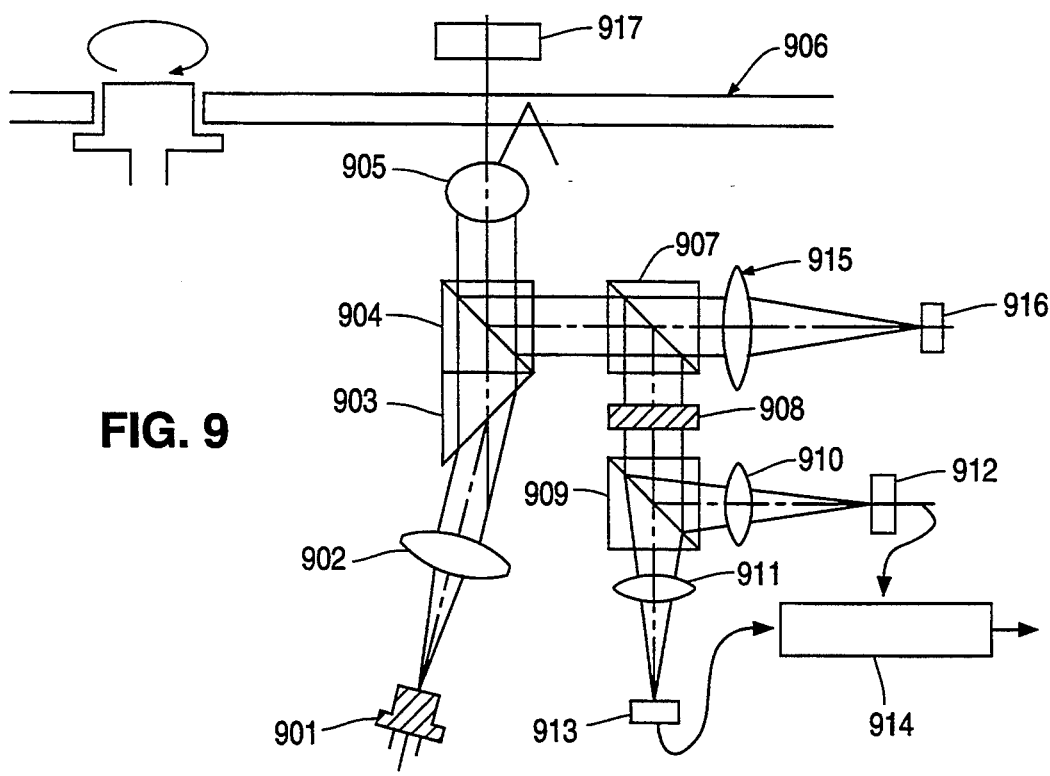
FIG. 9 is a schematic view of an conventional optical data reading apparatus.
Figure 10:
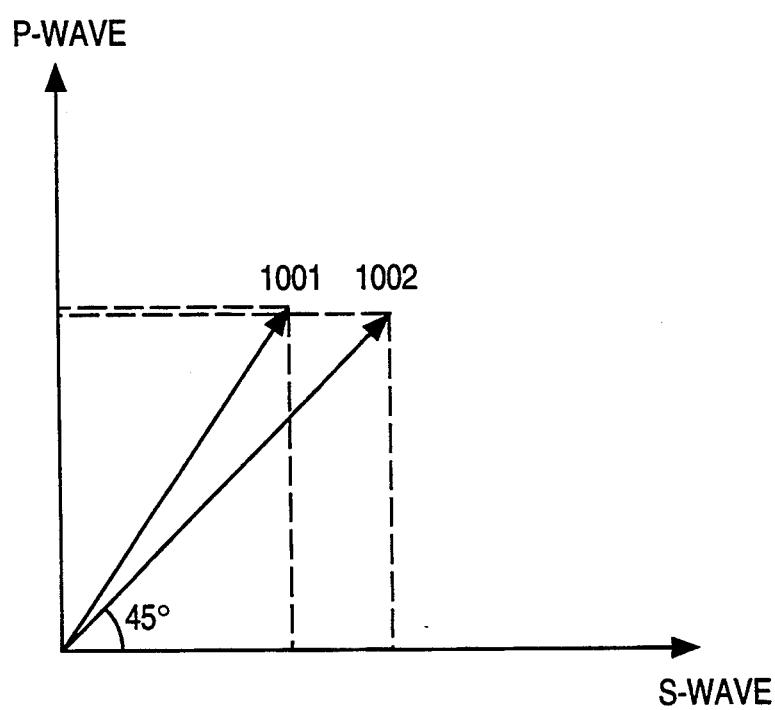
FIG. 10 is a graph illustrating directions of the planes of the polarization of two components $93183 included in laser light in the conventional optical data reading apparatus.

FIG. 8 shows a construction of such an optical data reading apparatus. In this example, a change in the intensity of light which is caused when the light is reflected and thus scattered is used as a signal to be restored. Accordingly, there is no need for detecting the rotation of the plane of polarization as is required in the first, second and third examples. The optical data reading apparatus in the fourth example does not include any polarization beam splitter for controlling the plane of polarization. The light reflected by the optical disc (i.e., signal light) and the reference light are mixed at a recording face of the optical disc, and detected by a PIN photodetector.

As is shown in FIG. 8, the optical data reading apparatus includes a DFB semiconductor laser 801 having a plurality of electrodes for modulating a frequency of the light emitted therefrom, a collimator lens 802, beam splitters 803, 804 and 809, deflecting mirrors 805 and 808, an objective lens 806, an optical disc 807 including a recording medium, a condenser lens 810, and a PIN photodetector 811.

The optical data reading apparatus having the above-mentioned construction is operated in the following manner.

Laser light emitted by the DFB semiconductor laser 801 is collimated by the collimator lens 802 and then divided into a first beam and a second beam by the beam splitter 803. The first beam is condensed at the recording medium of the optical disc 807 by the deflecting mirror 805 and the objective lens 806. An intensity of the laser light reflected by an area of the optical disc 807 having an element for scattering the light is lower than an intensity of the laser light reflected by an area of the optical disc 807 having no such element. The light reflected by the optical disc 807 (i.e., the signal light) is incident on the beam splitter 809 by the deflecting mirror 805, the beam splitter 804, and the deflecting mirror 808.

The second beam runs straight and is incident on the beam splitter 809. The first and the second beams are mixed at the beam splitter 809, condensed by the condenser lens 810, and then converted into an electric current as an electric signal by the PIN photodetector 811.

By modulating the oscillation wavelength of the DFB semiconductor laser 801 as in the first example, a difference is caused between the frequency of the reference light and that of the signal light when being incident on the PIN photodetector 811. As a consequence, a beat signal corresponding to such a difference is generated in the electric current outputted by the PIN photodetector 811. The beat signal is generated by an identical principle as that described in the first example, and thus explanation thereof is omitted.

Thus, in such a coherent detection, the signal light can substantially be amplified by using the reference light as is proven by Formula (4). Accordingly, a signal having a higher C/N value can be obtained. As a result, data stored in a high density disc can be read without using a semiconductor laser for emitting light having a shorter wavelength.

The present invention can further be applied to the following cases with identical effects with those described above:

(1) An optical data reading apparatus has a different practical construction from those in the above examples.

(2) Elements of the optical data reading apparatus, such as a light source, a photodetector and an optical device, are different from those in the above examples. For example, a device including a semiconductor laser and a phase modulator integrated on an identical substrate is used as the light source; and an avalanche photodiode is used as the photodetector.

(3) The parameters for frequency modulation or phase modulation, such as a modulation center frequency or a frequency deviation is different from those in the above examples.

According to the present invention, even when a recording area per bit is decreased, thus to lower the intensity of the signal light to be detected, the signal of the signal light is detected in a state of being amplified. As a result, a signal having a high C/N value is obtained, and thus highly reliable data reading is realized, with no necessity for using a laser for emitting a shorter wavelength than the one mainly used today.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical data reading apparatus in which laser light is radiated to a recording medium having data stored therein, the laser light having an identical size with that of a recording unit at the recording medium, and the laser light reflected by the recording medium is detected by a photodetector, whereby the data stored in the recording medium is read in a noncontact state, the optical data reading apparatus comprising:

laser light generating means for emitting the laser light while periodically modulating a frequency thereof;

light dividing means for dividing the laser light emitted by the laser light generating means into a first beam to be radiated to the recording medium and a second beam;

means for creating a difference in optical path length between the first beam and the second beam, and thus creating a difference between a frequency of the first beam and a frequency of the second beam;

means for mixing the first beam reflected by the recording medium and the second beam and directing light including the first beam and the second beam to be incident on the photodetector; and data restoring means for extracting an electric output from the photodetector based on the difference between the frequency of the first beam and the frequency of the second beam, and thus restoring the data stored in the recording medium.

2. An optical data reading apparatus according to claim 1, wherein the laser light generating means is a semiconductor laser whose light has a spectrum of a single longitudinal mode while a frequency thereof is periodically modulated.

3. An optical data reading apparatus according to claim 1, wherein the light dividing means is a beam splitter.

4. An optical data reading apparatus according to claim 1, wherein the data restoring means includes noise cancelling means for cancelling noise.

5. An optical data reading apparatus according to claim 1, wherein the first beam and the second beam are sufficiently different from each other in optical path length to cause a detectable frequency difference.

6. An optical data reading apparatus in which laser light is radiated to a recording medium having data stored therein, the laser light having an identical size with that of a recording unit at the recording medium, and the laser light reflected by the recording medium is detected by a photodetector, whereby the data stored in the recording medium is read in a noncontact state, the optical data reading apparatus comprising:

laser light generating means for emitting the laser light while periodically modulating a phase thereof;

light dividing means for dividing the laser light emitted by the laser light generating means into a first beam to be radiated to the recording medium and a second beam;

means for creating a difference in optical path length between the first beam and the second beam, and thus creating a difference between a phase of the first beam and a phase of the second beam;

means for mixing the first beam reflected by the recording medium and the second beam, and directing light including the first beam and the second beam to be incident on the photodetector; and data restoring means for extracting an electric output from the photodetector based on the difference between the phase of the first beam and the phase of the second beam, and thus restoring the data stored in the recording medium.

7. An optical data reading apparatus according to claim 6, wherein the laser light generating means is semiconductor laser whose light has a spectrum of a single longitudinal mode while an optical phase thereof is periodically modulated.

8. An optical data reading apparatus according to claim 6, wherein the light dividing means is a beam splitter.

9. An optical data reading apparatus according to claim 6, wherein the data restoring means includes noise cancelling means for cancelling noise.

10. An optical data reading apparatus according to claim 6, wherein the first beam and the second beam are sufficiently different from each other in optical path length to cause a detectable phase difference.

11. An optical data reading method in which laser light is radiated to a recording medium having data stored therein, the laser light having an identical size with that of a recording unit at the recording medium, and the laser light reflected by the recording medium is detected by a photodetector, whereby the data stored in the recording medium is read in a noncontact state, the optical data reading method comprising the steps of:

generating the laser light while periodically modulating a frequency thereof;

dividing the laser light into a first beam to be radiated to the recording medium and a second beam;

making a difference in optical length between the first beam and the second beam, and thus making a difference between a frequency of the first beam and a frequency of the second beam;

mixing the first beam reflected by the recording medium and the second beam, and directing light including the first beam and the second beam to be incident on the photodetector; and extracting an electric output from the photodetector through a beat signal generated by the difference between the frequency of the first beam and the frequency of the second beam, and thus restoring the data stored in the recording medium.

12. An optical data reading method according to claim 11, wherein the step of extracting the electric output and thus restoring the data includes a step of cancelling noise.

13. An optical data reading method according to claim 11, wherein the first beam and the second beam are sufficiently different from each other in optical path length to cause a detectable frequency difference.

14. An optical data reading method in which laser light is radiated to a recording medium having data stored therein, the laser light having an identical size with that of a recording unit at the recording medium, and the laser light reflected by the recording medium is detected by a photodetector, whereby the data stored in the recording medium is read in a noncontact state, the optical data reading method comprising the steps of:

generating the laser light while modulating a phase thereof;

dividing the laser light into a first beam to be radiated to the recording medium and a second beam;

creating a difference in optical path length between the first beam and the second beam, and thus creating a difference between a phase of the first beam and a phase of the second beam;

mixing the first beam reflected by the recording medium and the second beam, and directing light including the first beam and the second beam to be incident on the photodetector; and extracting an electric output from the photodetector through a beat signal generated by the difference between the phase of the first beam and the phase of the second beam, and thus restoring the data stored in the recording medium.

15. An optical data reading method according to claim 14, wherein the step of extracting the electric output and thus restoring the data includes a step of cancelling noise.

16. An optical data reading method according to claim 14, wherein the first beam and the second beam are sufficiently different from each other in optical path length to cause a detectable phase difference.

* * * * *